(12) United States Patent
Hallstadius et al.

(10) Patent No.: US 9,053,825 B2
(45) Date of Patent: Jun. 9, 2015

(54) FUEL ASSEMBLY

(75) Inventors: Lars Hallstadius, Vasteras (SE); Mats Dahlback, Vasteras (SE); Anders Soderlund, Surahammar (SE)

(73) Assignee: Westinghouse Electric Sweden AB, Vasteras (SE)

( * ) Notice: Subject to any disclaimer, the term of this patent is extended or adjusted under 35 U.S.C. 154(b) by 703 days.

(21) Appl. No.: 13/257,353

(22) PCT Filed: Mar. 3, 2010

(86) PCT No.: PCT/SE2010/050246
§ 371 (c)(1),
(2), (4) Date: Sep. 19, 2011

(87) PCT Pub. No.: WO2010/110721
PCT Pub. Date: Sep. 30, 2010

(65) Prior Publication Data
US 2012/0014496 A1  Jan. 19, 2012

(30) Foreign Application Priority Data
Mar. 25, 2009  (SE) ...................................... 0950187

(51) Int. Cl.
G21C 3/32 (2006.01)
G21C 3/324 (2006.01)

(52) U.S. Cl.
CPC . *G21C 3/32* (2013.01); *Y02E 30/40* (2013.01); *G21C 3/324* (2013.01)

(58) Field of Classification Search
CPC .............. G21C 3/00; G21C 3/30; G21C 3/32; G21C 3/322

USPC .......... 376/277, 409, 426, 434, 438, 448, 449
See application file for complete search history.

(56) References Cited

U.S. PATENT DOCUMENTS

| 4,478,786 A | 10/1984 | Andersson et al. | |
| 4,795,608 A * | 1/1989 | Nylund | 376/444 |
| 6,088,420 A * | 7/2000 | Yokoyama et al. | 376/434 |

FOREIGN PATENT DOCUMENTS

| JP | 60036985 | 2/1985 |
| JP | S60-115894 A | 6/1985 |

(Continued)

OTHER PUBLICATIONS

Office Action from corresponding Japanese Application No. 2012-501962, dated Jan. 28, 2014.

(Continued)

*Primary Examiner* — Jack W Keith
*Assistant Examiner* — Marshall O'Connor
(74) *Attorney, Agent, or Firm* — MKG, LLC

(57) ABSTRACT

A fuel assembly for a nuclear boiling water reactor is provided. The reactor comprises a plurality of such fuel assemblies and a plurality of control rods. Each control rod is insertable between the fuel assemblies. The fuel assembly has a longitudinal center axis and includes a plurality of elongated fuel rods and an elongated channel box. The channel box has inner sides, facing the fuel rods, and outer sides. Each inner and outer side has a longitudinal center line extending in parallel with the center axis and along the length of the channel box. A number of protrusions are distributed along the center line of at least two of the outer sides. The protrusions are configured to ensure a minimum distance between the outer side and an adjacent control rod and to enable the control rod to easily slide over and on top of the protrusions.

13 Claims, 4 Drawing Sheets

(56) References Cited

FOREIGN PATENT DOCUMENTS

| | | | | |
|---|---|---|---|---|
| JP | S60115894 A | | 6/1985 | |
| JP | 05011083 A | * | 1/1993 | ............. G21C 3/324 |
| JP | H05-011083 A | | 1/1993 | |
| JP | H0511083 A | | 1/1993 | |
| JP | 5107377 | | 4/1993 | |
| JP | 5323069 | | 12/1993 | |
| JP | 7134188 | | 5/1995 | |
| JP | H07-191173 A | | 7/1995 | |
| JP | 8015472 | | 1/1996 | |
| JP | 08015472 A | * | 1/1996 | ............. G21C 3/324 |

OTHER PUBLICATIONS

Supplementary European Search Report from corresponding EP Application No. 10756418.9, dated Nov. 26, 2014.

* cited by examiner

FUEL ASSEMBLY

FIELD OF THE INVENTION

The present invention concerns a fuel assembly for a nuclear boiling water reactor, wherein the reactor comprises a plurality of such fuel assemblies, and a plurality of control rods, each control rod being insertable in a respective control rod position between the fuel assemblies, wherein the fuel assembly has a longitudinal center axis and includes a plurality of elongated fuel rods, each fuel rod comprising nuclear fuel enclosed by a cladding, the fuel rods being held in predetermined positions relative one another with the help of a number of spacer grids, and an elongated channel box forming an outer casing of the fuel assembly and enclosing the fuel rods, the channel box having inner sides, facing the fuel rods, and outer sides, each inner side and each outer side having a longitudinal center line extending in parallel with the center axis and along the length of the channel box, wherein a number of protrusions are provided on the channel box to protrude from at least two of the outer sides.

The above described fuel assemblies and control rods are positioned in the core of the nuclear boiling water reactor (nuclear BWR). The channel boxes of the fuel assemblies in the nuclear BWR usually consist of a corrosion resistant material with a low neutron absorption capacity, such as a zirconium based alloy.

BACKGROUND OF THE INVENTION

The environment in the core of a nuclear BWR is demanding for the components positioned therein. The environment is for example highly oxidative. One of the consequences of this demanding environment inside the core of a nuclear BWR is that the channel box of the fuel assemblies may be distorted. The channel box may for example bulge or bow. Channel box bow is due to elongation of one channel box side relative the opposite channel box side. Channel box bow is known to arise for different reasons, e.g. initial manufacturing, residual stress relaxation under irradiation, differential irradiation growth and shadow corrosion.

The problem of shadow corrosion on components comprising zirconium based alloys in the core of a nuclear BWR has been known for a long time. Shadow corrosion is a local corrosion enhancement and can appear on a zirconium based alloy component when the component is in close contact with another metal. Referring to the above, shadow corrosion on the outer side of a channel box can occur when a control rod blade is inserted next to the channel box, i.e. when the channel box consisting of a zirconium based alloy is in close contact with a control rod blade usually having an outer surface of stainless steel.

Shadow corrosion early in the life of a fuel assembly, i.e. shadow corrosion on the fuel assembly due to an inserted control rod next to the fuel assembly during the first several months of operation, is generally believed to drive the problem of enhanced channel bow of the channel boxes in a nuclear BWR. The shadow corrosion can result in increased absorbed hydrogen-induced growth of the outer side of the channel box being closest to the control rod. The increased absorbed hydrogen-induced growth can lead to bowing of the channel box towards the control rod late in the life of the fuel assembly. The bow of the channel box towards the control rod may lead to channel box-control rod interference, which may for example cause the fuel assemblies to lift due to friction when the control rods are inserted into the core.

Studies have shown that shadow corrosion strongly depends on the distance between the zirconium based alloy component and the component comprising another metal. The occurrence of shadow corrosion is therefore most significant in the case of a large control rod blade and a small distance between the control rod blade and the channel box.

JP 05-323069 discloses a channel box for a nuclear BWR, wherein the channel box has axially projecting pads on the outer sides of the channel box. The projecting pads are provided on the two outer sides of the channel box that faces a control rod when the control rod is inserted into the core of the reactor. The object of the projecting pads is to ensure a gap between the fuel assemblies, where the control rod is to be inserted, even if the channel box is deformed by channel box bowing against the control rod. The bowing of the channel box is described to be caused by elongation of the channel box due to exposure to neutrons during operation. Accordingly, even if the channel box would bow towards the control rod, the projecting pads on the outer sides of the channel box will ensure that it is possible to insert a control rod between the fuel assemblies.

SUMMARY OF THE INVENTION

One object of the present invention is to mitigate shadow corrosion on the channel box of a fuel assembly of a nuclear BWR, thereby reducing the risk of shadow corrosion enhanced channel box bow.

The present invention resides in one aspect in a fuel assembly that includes protrusions distributed along the center line of the at least two outer sides, wherein the protrusions are configured to ensure a minimum distance between the outer side and an adjacent control rod, and to enable the control rod to easily slide over and on top of the protrusions.

The design of the fuel assembly according to the invention thereby prevents a control rod blade from coming too close to the channel box of the fuel assembly. Moreover, the design of the protrusions ensures a smooth insertion of the control rod between the fuel assemblies, preventing the control rod from being damaged.

According to an embodiment, the protrusions are distributed along the full length, or substantially the full length, of the outer sides of the channel box. By distributing the protrusions along substantially the full length of the outer sides, a smoother insertion of the control rod between the fuel assemblies can be achieved. Moreover, the action of mitigating shadow corrosion on the outer sides of the channel box will be more uniform over the outer sides when the protrusions are provided and distributed along substantially the full length of the outer sides.

According to an embodiment, the protrusions are distributed along the center line of each of the outer sides of the channel box. By providing protrusions on each of the outer sides of the channel box, the manufacturing of the box is facilitated and possible manufacturing problems are reduced. Furthermore, non-symmetric formation of shadow corrosion on the outer sides of the channel box may be prevented.

According to an embodiment, the protrusions protrude 0.5-1.5 mm, preferably 0.8-1.2 mm, from the outer sides of the channel box. Studies have shown that an increase of the distance between the control rod and the channel box from for example 0.4 mm to 1.0 mm can mitigate the shadow corrosion on the channel box by more than a factor of 2.

According to an embodiment, the protrusions are distributed at a distance of at least 50 mm from each other.

According to an embodiment, the protrusions are distributed at a distance of most 1000 mm from each other.

For example, the protrusions may be distributed at a distance of 80-120 mm, such as 100 mm, from each other.

According to an embodiment, the protrusions are evenly distributed along the center line of the outer sides of the channel box Preferably, the protrusions are distributed at equal distances from each other along the center line of the outer sides.

According to an embodiment, the protrusions have a curved shape, the curved shape facilitating the sliding of a control rod blade of the control rod over and on top of the protrusions.

According to an embodiment, the channel box comprises four walls extending in parallel with the center axis, the walls comprising said inner sides and said outer sides, respectively.

According to an embodiment, the channel box has a substantially square cross section seen in the direction of the center axis.

According to an embodiment, the fuel assembly further comprises an elongated support member extending in the direction of the center axis, the support member having a cruciform cross section seen in the direction of the center axis, wherein the support member is secured to the inner sides of the channel box through a plurality of weld joints along the center lines. The support and/or rigidity given to the fuel assembly by the support member substantially reduce stresses and deformations. The construction of a fuel assembly thereby including a support member thereby permits a significant reduction in the thickness of the channel box walls.

According to an embodiment, the support member comprises four wings, each wing being secured to a respective inner side of the channel box.

According to an embodiment, the support member divides the fuel rods of the fuel assembly into four equal sub-groups.

According to an embodiment, the support member is hollow, forming a vertical channel through which water can flow upwardly through the fuel assembly.

DETAILED DESCRIPTION

Figure 1:
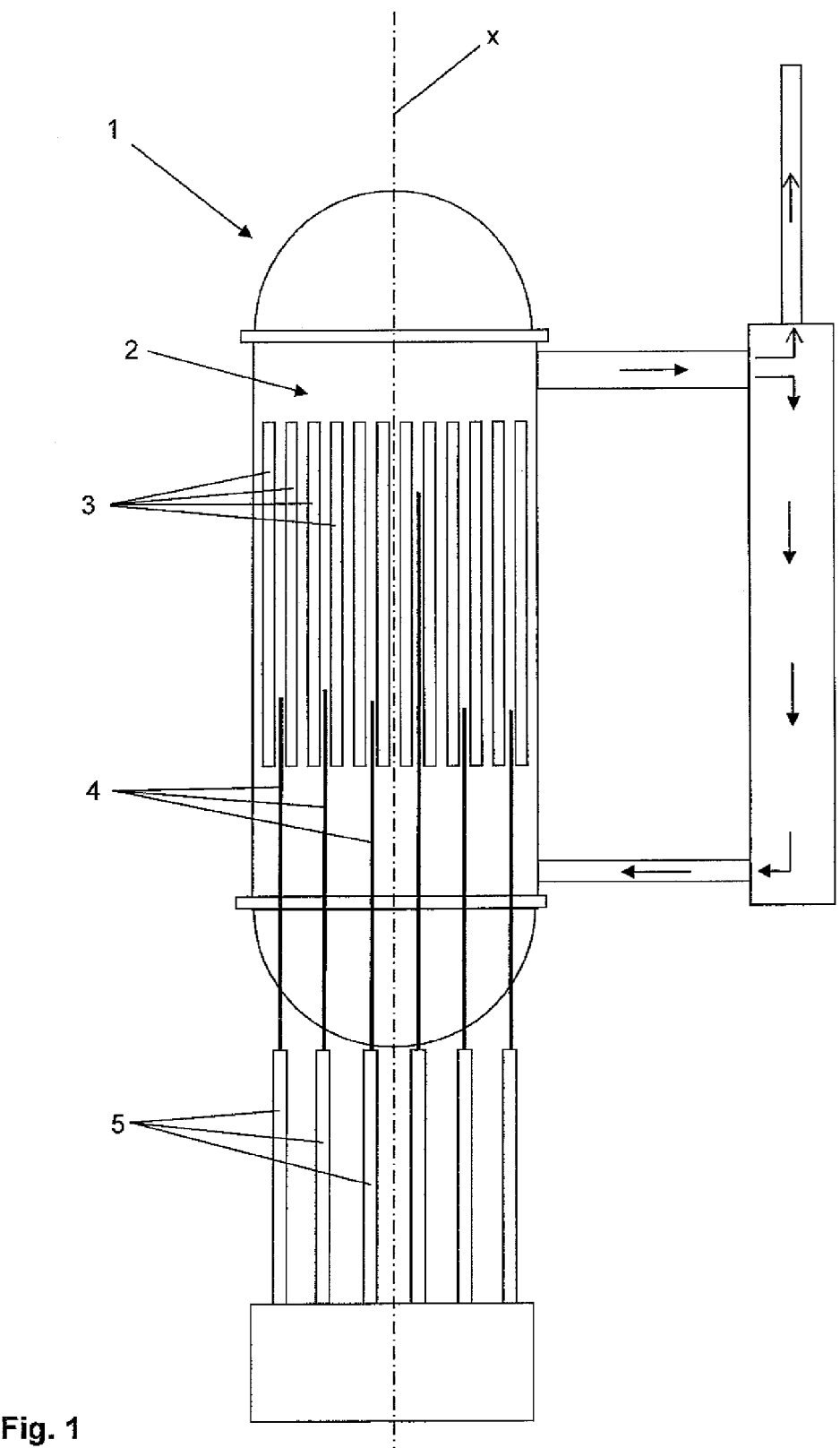
FIG. 1 schematically shows a nuclear plant comprising a reactor.

An embodiment of a nuclear boiling water reactor which can comprise the fuel assembly according to the invention will first be described with reference to FIG. 1. FIG. 1 shows part of a nuclear plant. The nuclear plant comprises a reactor 1. The reactor 1 comprises a core 2 having a plurality of fuel assemblies 3. Each fuel assembly 3 has a longitudinal center axis z, see FIG. 3. Furthermore, each fuel assembly 3 includes a plurality of elongated fuel rods 7, see FIG. 3. Each fuel rod 7 comprises nuclear fuel 7a and a cladding 7b enclosing the nuclear fuel 7a. The fuel rods 7 are held in predetermined positions relative one another with the help of a number of spacer grids, not shown. The reactor 1 further comprises a plurality of control rods 4 schematically indicated in FIG. 1. The control rods 4 are located between the fuel assemblies 3 and are connected to drive members 5. Each control rod 4 has four control rod blades 4a, see FIG. 3, disposed in a cruciform arrangement. The drive members 5 are able to move the control rods 4 up and down in a vertical direction x into and out from a respective position between the fuel assemblies 3.

Figure 2:
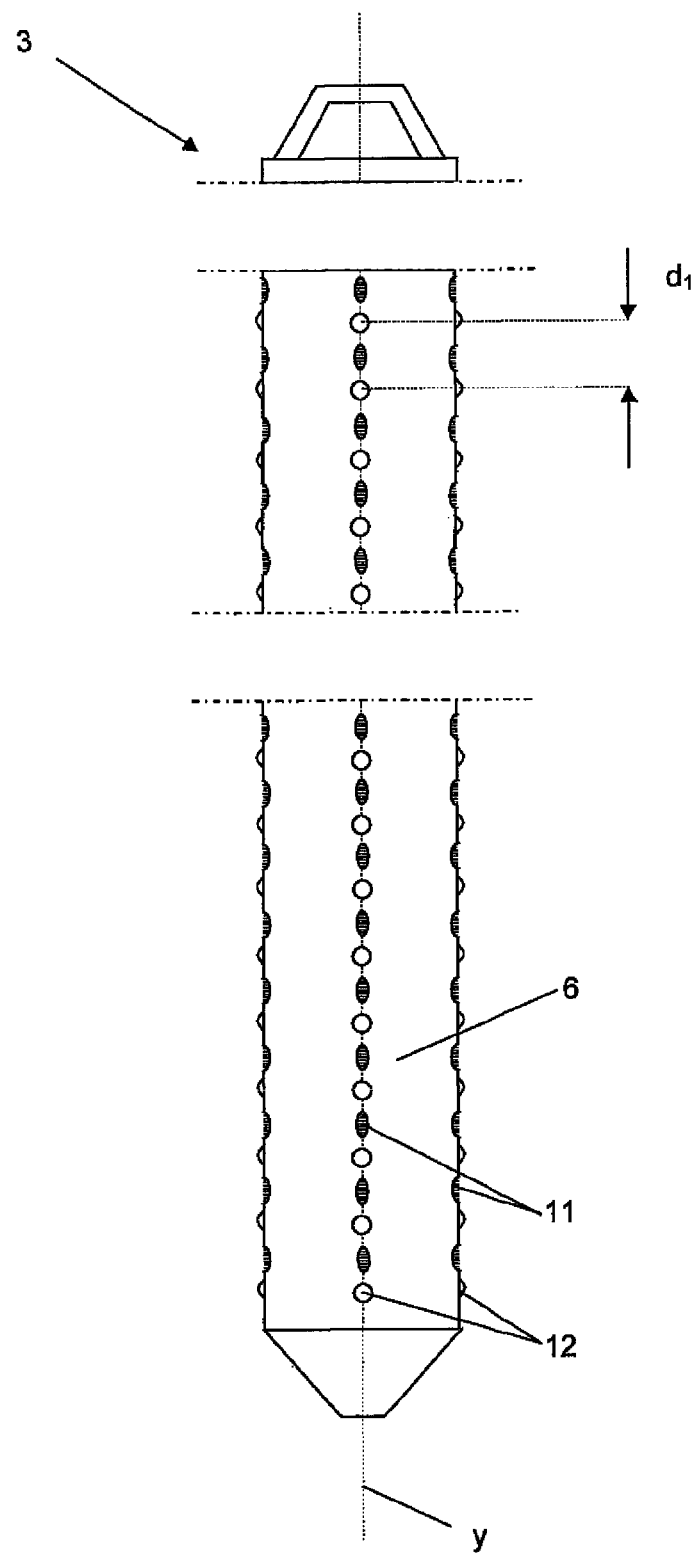
FIG. 2 schematically shows a fuel assembly according to the invention.
Figure 3:
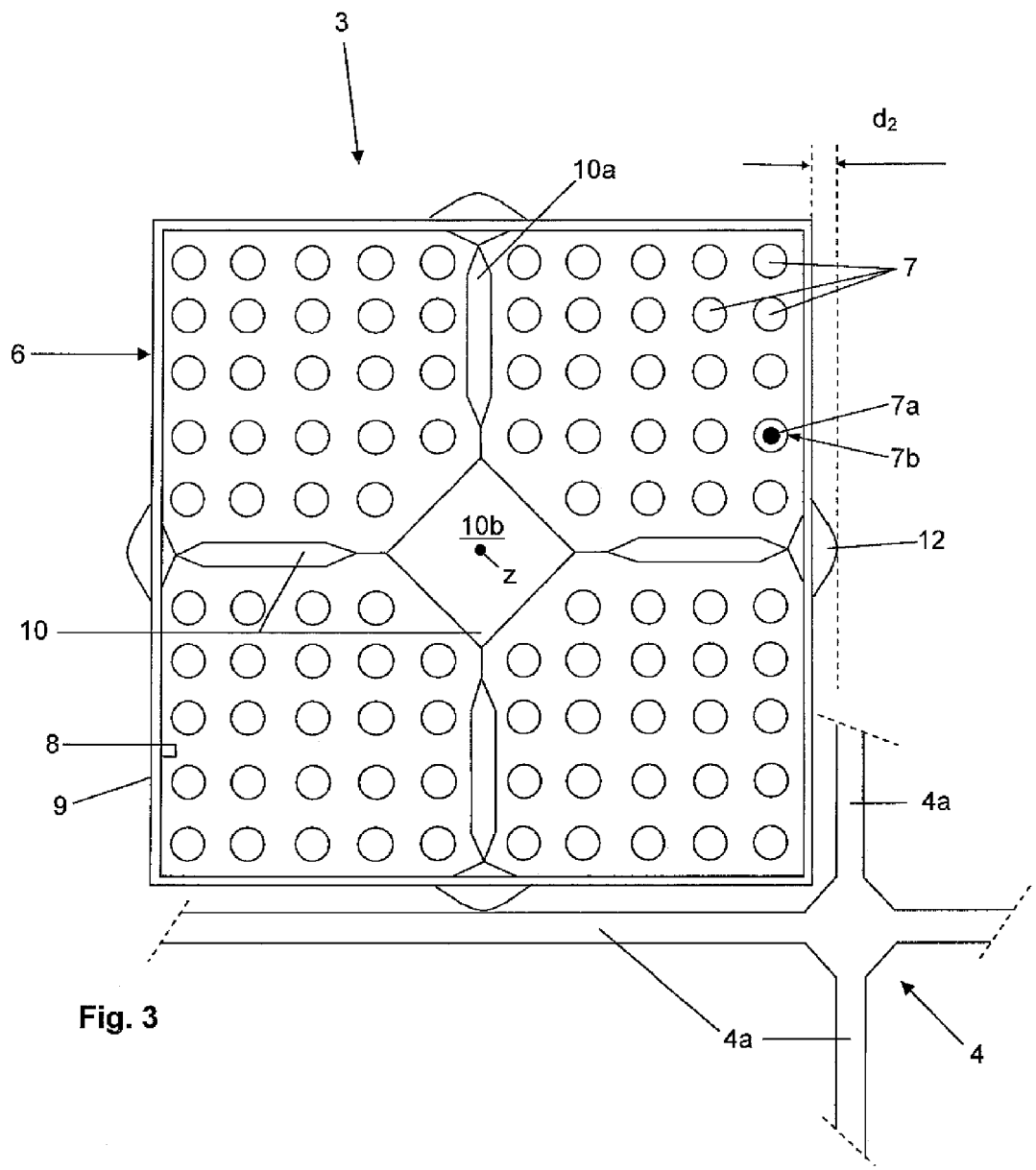
FIG. 3 schematically shows a cross section view in the direction of the center axis of a fuel assembly according to the invention.

An embodiment of a fuel assembly according to the invention will now be described with reference to FIG. 2 and FIG. 3. FIG. 2 and FIG. 3 show a fuel assembly 3 comprising an elongated channel box 6. The channel box 6 forms an outer casing of the fuel assembly 3 and has a square, or substantially square, cross section seen in the direction of the center axis z. The channel box 6 encloses a plurality of elongated fuel rods 7. The channel box 6 comprises four walls. The walls extend in parallel with the center axis z. Furthermore, the channel box 6 has four inner sides 8 and four outer sides 9. Each wall of the channel box 6 comprises or forms a respective inner side 8 and a respective outer side 9. The inner sides 8 of the channel box 6 face the fuel rods 7. Each inner side 8 and each outer side 9 has a longitudinal center line y extending in parallel with the center axis z along the length of the channel box 6.

The fuel assembly 3 further comprises an elongated support member 10 extending in the direction of the center axis z. The support member 10 has a cruciform cross section seen in the direction of the center axis z. The support member 10 is secured to the inner sides 8 of the channel box 6 via a plurality of weld joints 11 along the center lines y. In the embodiment according to FIG. 3, the support member 10 has four wings 10a. Each wing 10a is secured via the weld joints 11 to a respective inner side 8 of the channel box 6. Furthermore, the support member 10 has a center part 10b. In the present embodiment, the wings 10a and the center part 10b are hollow. However, the wings 10a and the center part 10b may also be solid. The hollow support member 10 of the present embodiment forms a vertical channel through which water can flow upwardly through the fuel assembly 3. Furthermore, the support member 10 divides the fuel rods 7 of the fuel assembly 3 into four equal sub-groups. Each sub-group has an approximately square cross section seen in the direction of the center axis z.

Figure 4:
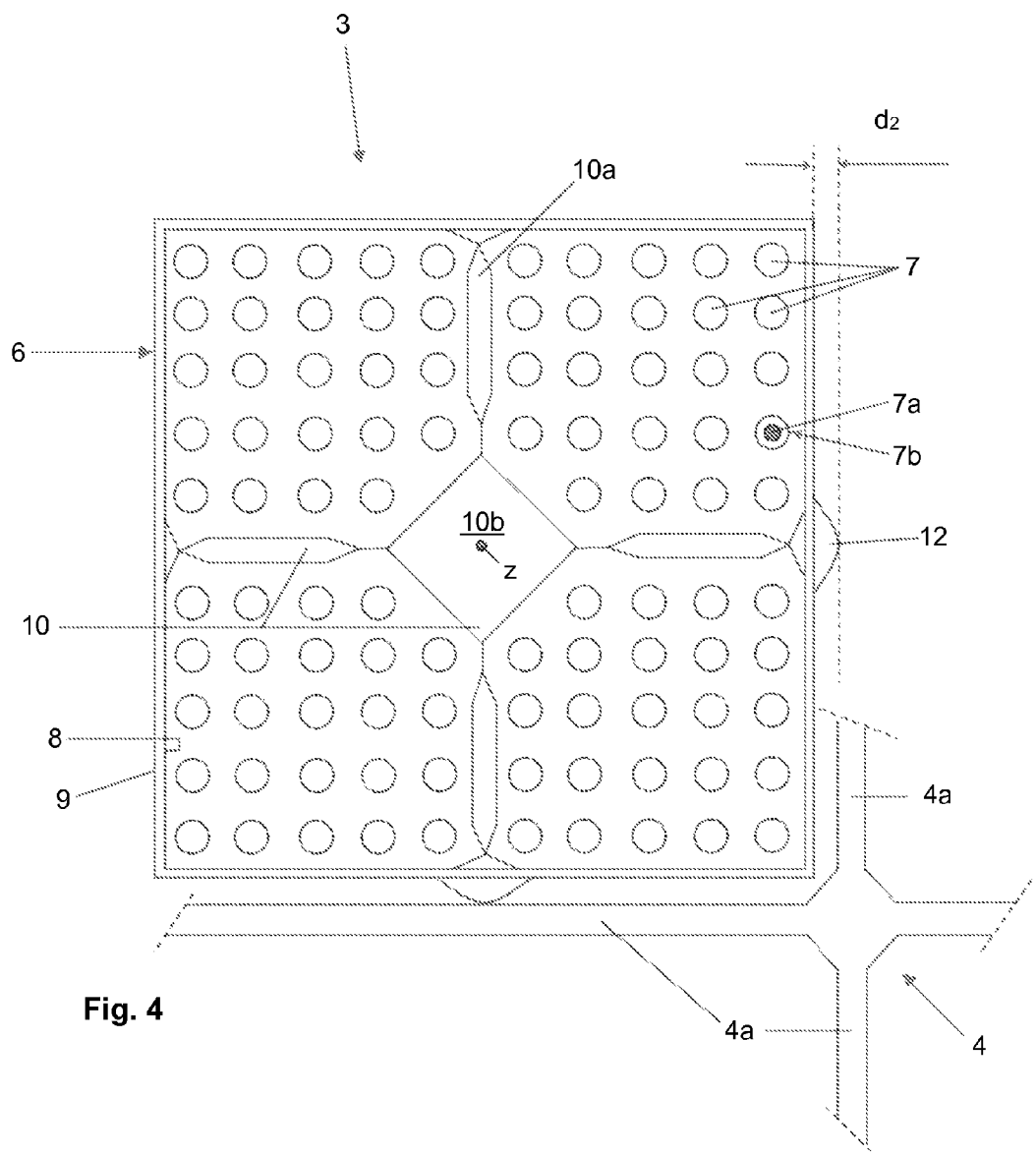
FIG. 4 schematically shows a cross section view in the direction of the center axis of a fuel assembly according another embodiment to the invention.

A number of protrusions 12 are provided on the channel box 6 to protrude from at least two of the outer sides 9. As shown FIG. 4 the protrusions 12 are present on two of the outer sides 9. In one embodiment, shown in FIGS. 2 and 3 the protrusions are present on four of the outer sides 9. As shown in FIG. 2 there are a plurality of the protrusions 12 distributed along the center line y of the outer sides 9. The protrusions 12 are distributed along substantially the full length, or the full length, of the outer sides 9. Preferably, the protrusions 12 are distributed along the center line y of each of the outer sides 9 of the channel box 6. Moreover, the protrusions 12 are evenly distributed along the center line y. Preferably, the protrusions 12 are evenly distributed between the weld joints 11, as shown in FIG. 2, i.e. there may be a protrusion 12 between each pair of adjacent weld joints 11. The protrusions 12 are distributed at a distance $d_1$ of at least 50 mm from each other and of most 1000 mm, 800 mm, 600 mm, 400 mm, 200 mm or less from each other. For example, the protrusions are distributed at a distance $d_1$ of 100 mm from each other.

The protrusions 12 are configured to ensure a minimum distance $d_2$ between the outer side 9 and an adjacent control rod blade 4a. The protrusions 12 protrude a distance $d_2$ of about 0.5-1.5 mm from the outer sides 9 of the channel box 6. Preferably, the protrusions 12 protrude 1.0 mm or slightly less, such as for example 0.8-1.2 mm, from the outer sides 9. Furthermore, the protrusions 12 are configured to enable a control rod 4 to easily slide over and on top of them. Preferably, the protrusions 12 have a curved shape at least when seen in a direction perpendicular to the center axis z of the channel box 6, see FIG. 2. The curved shape facilitates the sliding of the control rod 4 over and on top of the protrusions 12.

The minimum distance $d_2$ between the outer sides 9 of the channel box 6 and an inserted control 4 rod mitigates the phenomenon of shadow corrosion on the outer sides 9 of the channel box 6. The mitigation of shadow corrosion on the channel box 6 reduces the risk of channel box bow towards the control rod 4. Shadow corrosion may however occur on the protrusions 12, but then only locally.

The present invention is not limited to the shown embodiments but can be varied and modified within the scope of the following claims.

The invention claimed is:

1. A fuel assembly for a nuclear boiling water reactor, wherein the reactor comprises a plurality of fuel assemblies, and a plurality of control rods, each control rod being insertable in a respective control rod position between the fuel assemblies, the fuel assembly includes a longitudinal center axis and further comprises;
   a plurality of elongated fuel rods, each fuel rod comprising nuclear fuel enclosed by a cladding, the fuel rods being held in predetermined positions relative one another, and
   an elongated channel box forming an outer casing of the fuel assembly and enclosing the fuel rods, the channel box having inner sides, facing the fuel rods, and outer sides, each inner side and each outer side having a longitudinal center line extending substantially in parallel with the center axis and along the length of the channel box, protrusions are provided on the channel box to protrude from a respective one of at least two of the outer sides, on each of said at least two outer sides a plurality of said protrusions being provided and being distributed at a first distance from each other along the center line of the respective one of the at least two outer sides, said first distance being at least 50 mm, wherein the plurality of protrusions are configured to provide a minimum second distance between the outer side and an adjacent control rod, and to enable the control rod to easily slide over and on top of the plurality of protrusions; and
   wherein the protrusions have a curved shape, the curved shape facilitating the sliding of a control rod blade of the control rod over and on top of the protrusions.

2. A fuel assembly according to claim 1, wherein the plurality of protrusions are distributed along substantially the full length of the outer sides of the channel box.

3. A fuel assembly according to claim 1, wherein the plurality of protrusions are distributed along the center line of each of the outer sides of the channel box.

4. A fuel assembly according to claim 1, wherein each of the plurality of protrusions protrude 0.5-1.5 mm from the outer sides of the channel box.

5. A fuel assembly according to claim 1, wherein each of the plurality of protrusions protrude 0.8-1.2 mm, from the outer sides of the channel box.

6. A fuel assembly according to claim 1, wherein said first distance is about 1000 mm.

7. A fuel assembly according to claim 1, wherein the plurality of protrusions are evenly distributed along the center line of the outer sides of the channel box.

8. A fuel assembly according to claim 1, wherein the channel box comprises four walls extending substantially parallel with the center axis, the walls comprising said inner sides and said outer sides, respectively.

9. A fuel assembly according to claim 1, wherein the channel box has a substantially square cross section seen in the direction of the center axis.

10. A fuel assembly according to claim 1, wherein the fuel assembly further comprises an elongated support member extending in the direction of the center axis, the support member having a cruciform cross section seen in the direction of the center axis, wherein the support member is secured to the inner sides of the channel box through a plurality of weld joints along the center lines.

11. A fuel assembly according to claim 10, wherein the support member comprises four wings, each wing being secured to a respective inner side of the channel box.

12. A fuel assembly according to claim 10, wherein the support member divides the fuel rods of the fuel assembly into four equal sub-groups.

13. A fuel assembly according to claim 10, wherein the support member is hollow, forming a substantially vertical channel through which water can flow upwardly through the fuel assembly.

* * * * *